(12) United States Patent
Lynas et al.

(10) Patent No.: US 8,523,114 B2
(45) Date of Patent: Sep. 3, 2013

(54) AIRCRAFT FUEL TANK SYSTEM

(75) Inventors: Christopher Lynas, Bristol (GB); Peter William James, Bristol (GB); Keith MacGregor, Bristol (GB)

(73) Assignee: Airbus Operations Limited, Bristol (GB)

( * ) Notice: Subject to any disclaimer, the term of this patent is extended or adjusted under 35 U.S.C. 154(b) by 378 days.

(21) Appl. No.: 12/868,945

(22) Filed: Aug. 26, 2010

(65) Prior Publication Data

US 2011/0056971 A1    Mar. 10, 2011

(30) Foreign Application Priority Data

Sep. 4, 2009 (GB) .................................. 0915363.6
Apr. 29, 2010 (GB) .................................. 1007162.9

(51) Int. Cl.
*B64D 37/02* (2006.01)

(52) U.S. Cl.
USPC ................... 244/135 C; 220/745; 244/135 R

(58) Field of Classification Search
USPC .......................... 244/135 C, 135 R; 220/745
See application file for complete search history.

(56) References Cited

U.S. PATENT DOCUMENTS

| | | | | |
|---|---|---|---|---|
| 2,827,911 A * | 3/1958 | Ayer et al. | ..................... | 137/81.1 |
| 2,966,160 A * | 12/1960 | Forrester et al. | ................. | 137/43 |
| 3,409,253 A * | 11/1968 | Berg et al. | .................. | 244/135 R |
| 3,691,730 A * | 9/1972 | Hickey et al. | ................... | 96/161 |
| 3,748,111 A * | 7/1973 | Klose | ............... | 48/192 |
| 3,788,040 A * | 1/1974 | Bragg et al. | .................... | 96/164 |
| 5,381,742 A * | 1/1995 | Linton et al. | .................. | 110/238 |
| 5,794,707 A * | 8/1998 | Alhamad | ........................ | 169/69 |
| 6,105,676 A * | 8/2000 | Alhamad | ........................ | 169/45 |
| 6,216,791 B1 * | 4/2001 | Alhamad | ........................ | 169/45 |
| 6,823,831 B2 * | 11/2004 | Chu et al. | .................. | 123/198 D |

FOREIGN PATENT DOCUMENTS

| | | | |
|---|---|---|---|
| EP | 1591359 | * | 2/2005 |
| EP | 1591359 | | 11/2005 |
| GB | 2008521 | | 6/1979 |

OTHER PUBLICATIONS

UK Search Report for GB0915363.6 dated Dec. 31, 2009.
UK Search Report for GB1007162.9 dated Aug. 11, 2010.

* cited by examiner

*Primary Examiner* — Tien Dinh
*Assistant Examiner* — Justin Benedik
(74) *Attorney, Agent, or Firm* — Lowe Hauptman & Berner, LLP

(57) ABSTRACT

An aircraft fuel tank system is disclosed in which a vent tank is provided with an additional ullage vent for use, in combination with an eternal flame barrier means, when refuelling.

16 Claims, 8 Drawing Sheets

AIRCRAFT FUEL TANK SYSTEM

RELATED APPLICATIONS

The present application is based on, and claims priority from, Great Britain Applications Number 0915363.6, filed Sep. 4, 2009, and 1007162.9, filed Apr. 29, 2010 and the disclosures of which are hereby incorporated by reference herein in their entirety.

FIELD OF INVENTION

The present invention relates to an aircraft fuel tank system.

BACKGROUND OF THE INVENTION

Fuel tank systems for aircraft commonly comprise one or more fuel tanks and a vent tank. The vent tank may also be referred to as a surge tank. The vent tank is arranged to provide venting means to vent the fuel tanks to atmosphere. Vent tanks are arranged to allow air to flow from atmosphere into the fuel tanks as they are drained and to allow air, fuel vapour or inerting gasses or a mixture of these to flow out of the tanks to atmosphere as the tanks are filled. In addition, during such fill or drain operations, vent tanks are also commonly required to equalize pressures in normal operation due to ambient pressure changes.

Vent tanks are commonly arranged with a predetermined liquid fuel storage capacity. This capacity provides storage for liquid fuel forced from the fuel tanks and vent system into the vent tank, for example, as a result of an aircraft manoeuvre or overfilling of the fuel tanks during refuelling of the aircraft. While vent tanks are commonly arranged with means for returning such surges of fuel to the fuel tanks in a controlled manner, if the liquid fuel capacity of the vent tank is exceeded the fuel is vented to atmosphere.

One problem with such surges of liquid fuel is that they may be at a relatively high pressure during filling. If such pressure is not properly vented then the fuel tank system may be physically damaged. This is a particular problem if the fuel tank system comprises an integral part of the aircraft structure. The problem may be exacerbated when fuel is cold and thus more viscous and therefore more resistant to flow through the venting system.

Another problem exists in that fuel storage space in an aircraft is limited and valuable. Vent tanks may be located in areas that are not suitable for fuel storage and generally need to be as space efficient as possible while providing the required vent capacity. For example, vent tanks are commonly located in the wing tips of an aircraft where space, particularly depth, is restricted.

SUMMARY OF THE INVENTION

An embodiment of the invention provides an aircraft fuel tank system comprising:
a vent tank comprising an inlet from one or more fuel tanks and a first and second ullage vent means, the vent tank being arranged to provide a predetermined maximum fuel capacity and having a minimal ullage at the maximum fuel capacity;
sealing means arranged in a closed position to provide a fluid tight seal for the second ullage vent and operable between the closed position and an open position for enabling fluid flow between the vent tank and atmosphere via the second ullage vent;
an external flame barrier means comprising a flame barrier element and vent means, the external flame barrier means being arranged for insertion through the second ullage vent into the ullage of the vent tank so as to provide a conduit for the fluid flow between the vent tank via the vent means and the flame barrier element to atmosphere; and
valve means operable to open or close the vent means.

The sealing means may be arranged to operate automatically in response to the insertion of the external flame barrier means. The ullage vent may be arranged to sealingly engage with the external flame barrier means prior to the sealing means opening so as to mitigate spillage from the vent tank during the insertion. The valve means may be arranged to open or close automatically in response to the respective insertion or removal of the external flame barrier means. The sealing means may be arranged to be carried upwardly by the external flame barrier means during the insertion. The sealing means may be arranged to be coupled to and carried by the external flame barrier means during the insertion.

The fuel tank system may further comprise locking means arranged to lock the sealing means in the closed position and to unlock the sealing means in response to the insertion of the external flame barrier means. The locking means may be arranged to prevent removal of the external flame barrier means from the second ullage vent unless the sealing means is in the closed position. The locking means may be operable to prevent opening of the valve means unless the external flame barrier means is fully inserted. The valve means may be carried by the external flame barrier means. The valve means may comprise a sleeve member slideably operable to open and close the vent means.

The aircraft fuel tank system may further comprise a vent pipe providing fluid communication between the second ullage vent and the ullage. The external flame barrier means may be arranged to clear the vent pipe by the insertion. The insertion of the external flame barrier means may be arranged to move the sealing means along and out of the vent pipe. The sealing means may comprise a bore adjacent the second ullage vent and a piston operable to open the second ullage vent when sealably engaged within the bore and to open the second ullage vent when positioned out of the bore, the sealing means being operable in response to the insertion of the external flame barrier means via the second ullage vent.

BRIEF DESCRIPTION OF THE DRAWINGS

Embodiments of the invention will now be described, by way of example only, with reference to the accompanying drawings in which.

DETAILED DESCRIPTION OF EMBODIMENTS OF THE INVENTION

Figure 1:
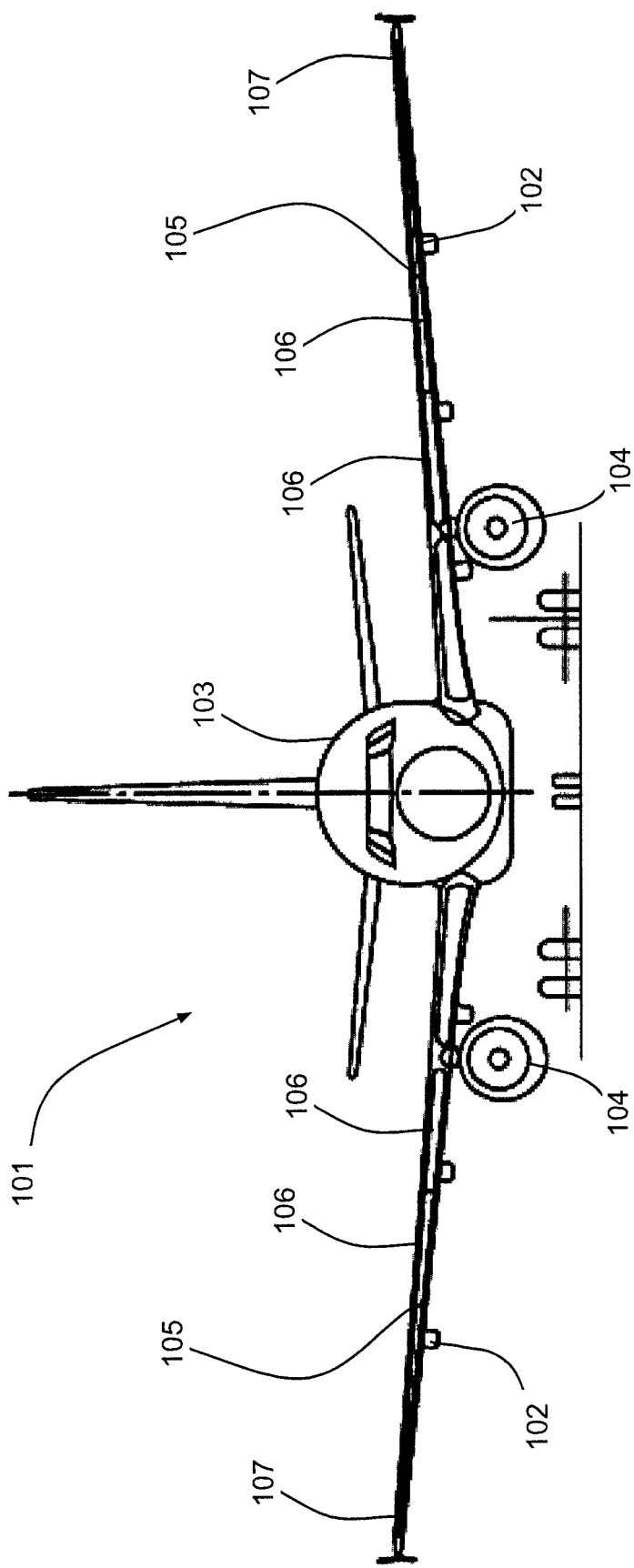
FIG. 1 is a schematic front view of an aircraft.

With reference to FIG. 1, an aircraft 101 comprises a pair of wings 102 faired into a fuselage 103. Each wing 102 carries an engine 104 and part of an internally located fuel tank system 105. The fuel tank system 105 provides fuel to the engines 104. The fuel tank system comprises a set of fuel tanks 106 and two vent tanks 107 each built-in to a respective one of the wings 102. The vent tanks 107 are each located towards the tip of their respective wings 102. The vent tanks 107 are arranged to perform a number of functions. Firstly, the vent tanks 107 vent the ullage of each of the fuel tanks 106 to atmosphere to enable the ingress of air required to equalise negative pressure in the fuel tanks as a result of, for example, fuel being burned by the engines 104 or a decrease in altitude of the aircraft 101. Secondly, the vent tanks 107 vent the ullage of each of the fuel tanks 106 to atmosphere to enable the egress of positive pressure of air, fuel vapour or inerting gasses from the tanks as a result, for example, of an increase in ambient temperature or altitude of the aircraft 101. Thirdly, the vent tanks 107 are arranged to vent excess liquid fuel from the fuel tanks 106 to atmosphere as a result of, for example, exceptional manoeuvres of the aircraft 101 or by overfilling of the fuel tanks 106 during a refuelling process.

Figure 2:
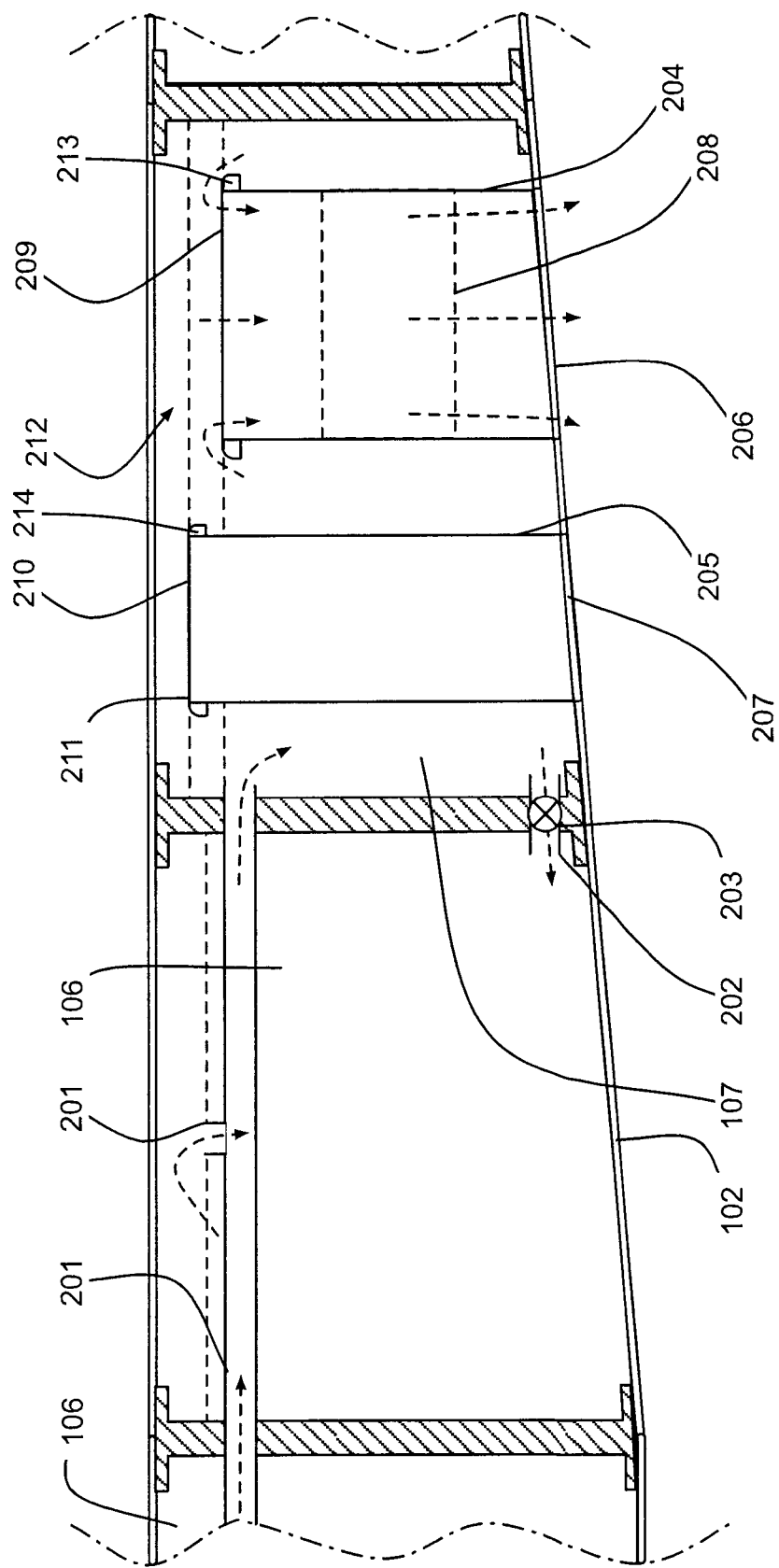
FIG. 2 is a cross-sectional front view of a vent tank comprising a first and second vent pipes in the fuel tank system of the aircraft of FIG. 1.

With reference to FIG. 2, in the present embodiment two fuel tanks 106 and the vent tank 107 are provided by the internal structure of each of the wings 102. The fuel tanks 106 are arranged with a ventilation system comprising a first set of conduits 201 for venting the ullage of each respective fuel tank 106 into the vent tank 107. The fuel and vent tanks 106, 107 are further provided with a fuel return system comprising a second set of conduits 202 controlled by pumps 203 having non-return valves that enable the controlled return of fuel from the vent tank 107 to the fuel tanks 106.

The vent tank 107 further comprises first and second vent pipes 204, 205 arranged to provide fluid communication between the interior of the vent tank 107 and atmosphere via respective first and second ullage vents 206, 207 positioned in the lower wall of the ullage tank 107 and the aircraft wing 102. In the present embodiment, the vent pipes 204, 205 are cylindrical and arranged vertically within the vent tank 107 when the aircraft 101 is level. The vent pipes 204, 205 each have their respective lower open ends in direct fluid communication with the first and second ullage vents 206, 207. In the present embodiment, the second vent pipe 205 is positioned inboard of the first vent pipe 204 within the vent tank 107. The first vent pipe 204 further comprises a flame barrier means 208 arranged to prevent an external flame front from entering the vent tank 107 via the first ullage vent 206 and vent pipe 204.

In the present embodiment, the upper open end 209 of the first vent pipe 204 is positioned level with the maximum designed liquid fuel level 211 of the vent tank 107. The upper open end 210 of the second vent pipe 205 is positioned above that of the first vent pipe at a position generally midway between the maximum designed liquid fuel level 211 and the upper wall of the vent tank 107. The space in the vent tank 107 above the maximum designed fuel level 211 is the minimal ullage 212. In the present embodiment, the upper end 209, 210 of each vent pipe 204, 205 is provided with a lip 213, 214.

Figure 3:
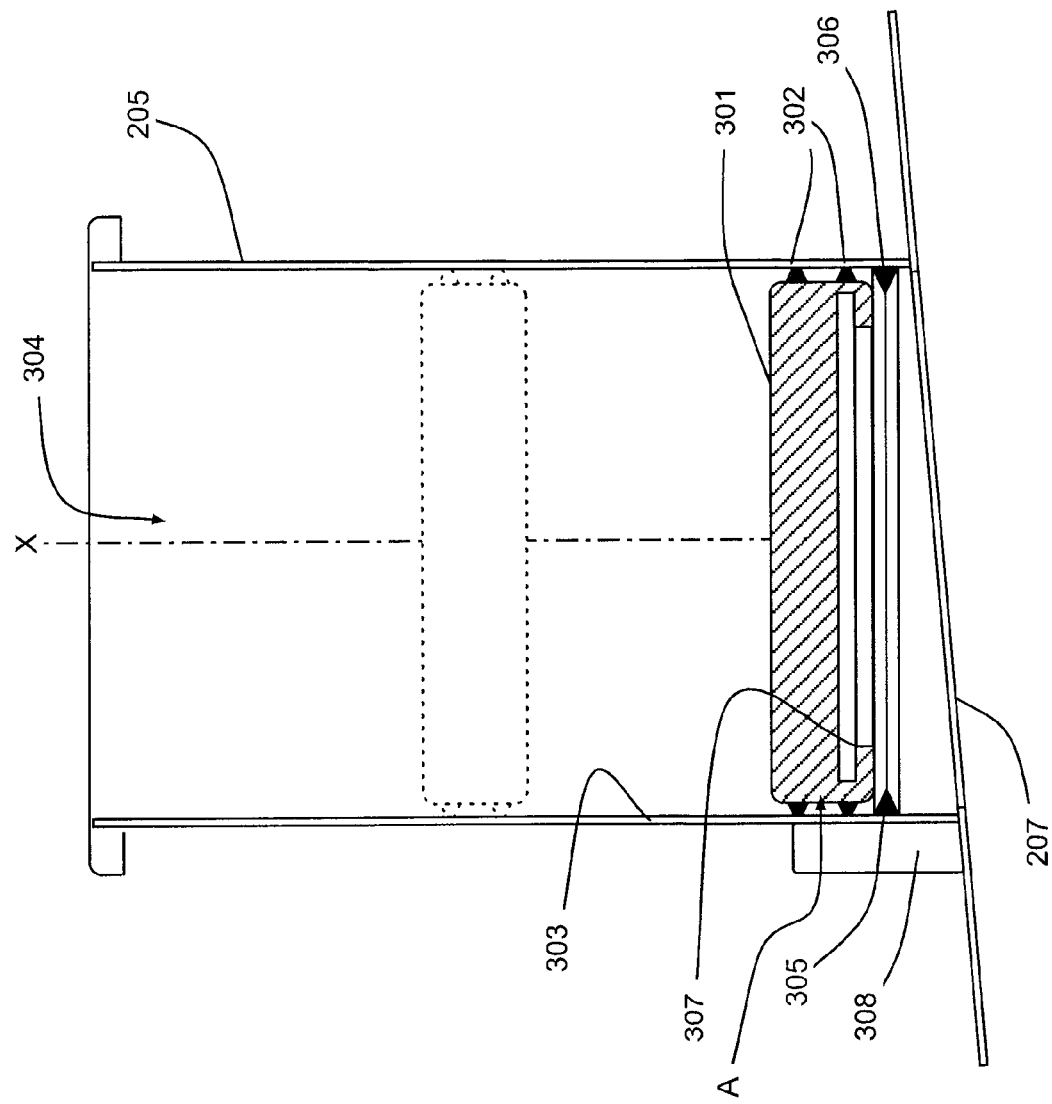
FIG. 3 is a schematic cross-sectional side view of the second vent pipe of FIG. 2.

With reference to FIG. 3, the second vent pipe 205 is fitted internally with sealing means in the form of a piston 301. The piston 301 comprises a disk of impermeable material and carries a pair of circumferential seals 302. The seals 302 are arranged to provide a fluid tight seal between the piston 301 and the interior surface 303 of the second vent pipe 205 so as to form a closure for the second ullage vent 207. The piston 301 is arranged so as to be slideable along the central axis X of the bore 304 provided by the interior surface 303 while maintaining the fluid tight seal. A seat 305 is formed in the interior surface 303 at the end of the bore 304 adjacent the second ullage vent 207 and located in a plane normal to the central axis X. A lip seal 306 is located in the seat 305 having a sealing lip oriented towards the central axis X. The function of the lip seal 306 will be described in further detail with reference to FIG. 5. The lower surface of the piston 301 is provided, in the present embodiment, with the female part of a bayonet coupling 307. The function of the female part of a bayonet coupling 307 will be described in further detail with reference to FIG. 5.

The second vent pipe 205 is provided with a locking means 308. The locking means 308 is arranged to lock the piston 301 in a first position A, adjacent the lip seal 306 at the lower end of the bore 304. The locking means 308 is further arranged to be responsive to the completion of the coupling of a complementary male bayonet coupling to the female part of a bayonet coupling 307 to release the piston 301 so as to be slideable along the central axis X of the bore 304 provided by the interior surface 303 while maintaining the fluid tight seal. Furthermore, the locking means 308 is further arranged to only enable the release of the complementary female bayonet coupling from the male part of a bayonet coupling 307 when the piston 301 is located at its first position A. In the present embodiment, the locking means 308 is provided by a first locking mechanism part at the base of the second vent pipe 205 and a second locking mechanism part provided within the female part of a bayonet coupling 307. The first locking mechanism part is arranged to perform the unlocking or locking of the piston 301 at position A in response to the respective coupling or decoupling of the complementary male bayonet coupling from the female part of a bayonet coupling 307. The second locking mechanism part is arranged to unlock or lock the complementary male bayonet coupling to the female part of a bayonet coupling 307 in response to the piston 301 being located respectively at or away from the position A.

Figure 4:
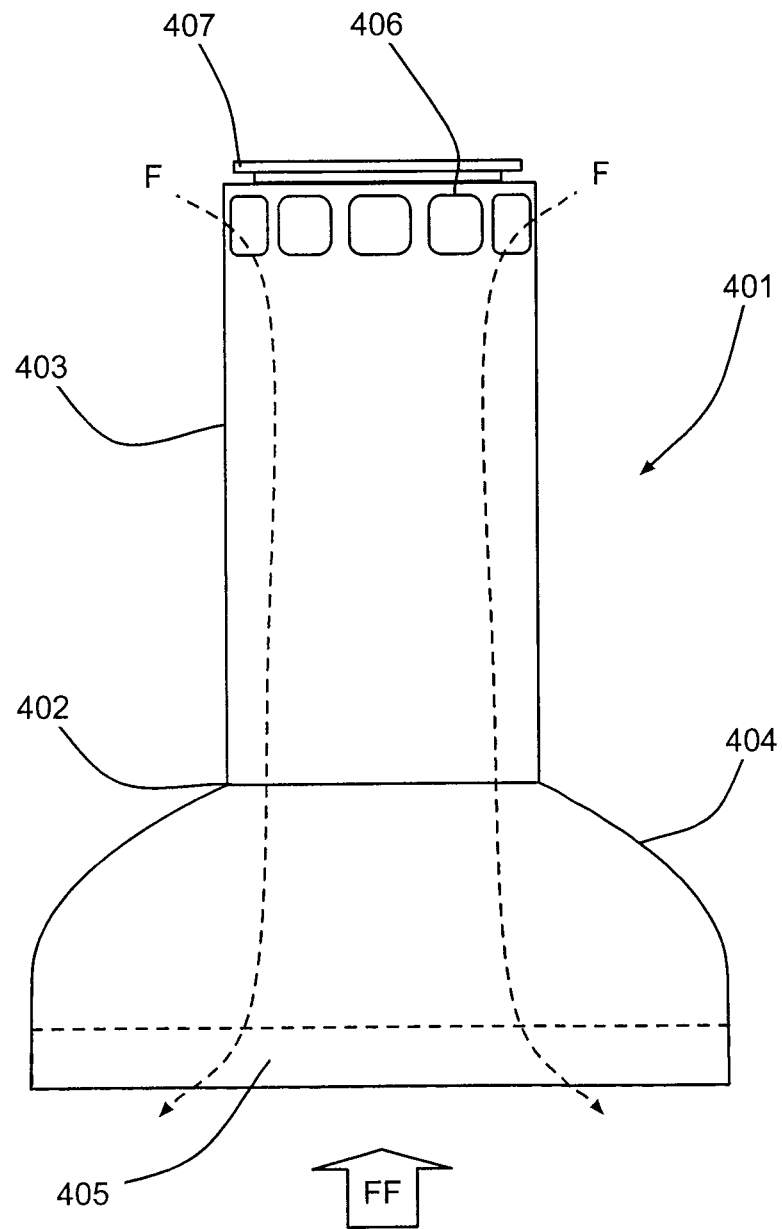
FIG. 4 is a schematic side view of external flame barrier means for use with the second vent pipe of FIG. 3.

With reference to FIG. 4, an external flame barrier means 401 comprises a hollow body member 402 comprising a substantially cylindrical upper part 403 and a bell-shaped lower part 404. The lower part 404 is open to atmosphere at its at its lowest end as shown in FIG. 4. A flame barrier element 405 is fixed within the lower part 404 adjacent its open end and arranged to provide a flame barrier for preventing ingress of an external flame front FF to the interior of the flame barrier means 401. An array of radially spaced vents 406 is provided in the upper part 403 of the body member 402 adjacent its upper end as shown in FIG. 4. The vents 406 are arranged to provide fluid flow or communication F between the ullage 212, the interior of the flame barrier means 401 and atmosphere when in use as describe below. The upper end of the upper part 403 of the body member 402 carries a male coupling means 407 in the form the male part of a bayonet coupling that is complimentary to the female part of the bayonet coupling 307 carried by the piston 301. Furthermore, the upper part 403 of the body member is dimensioned so as to be slideable within the second vent pipe 205 while maintaining a fluid tight seal between the exterior surface of the upper part 403 and the lip seal 306.

Figure 5:
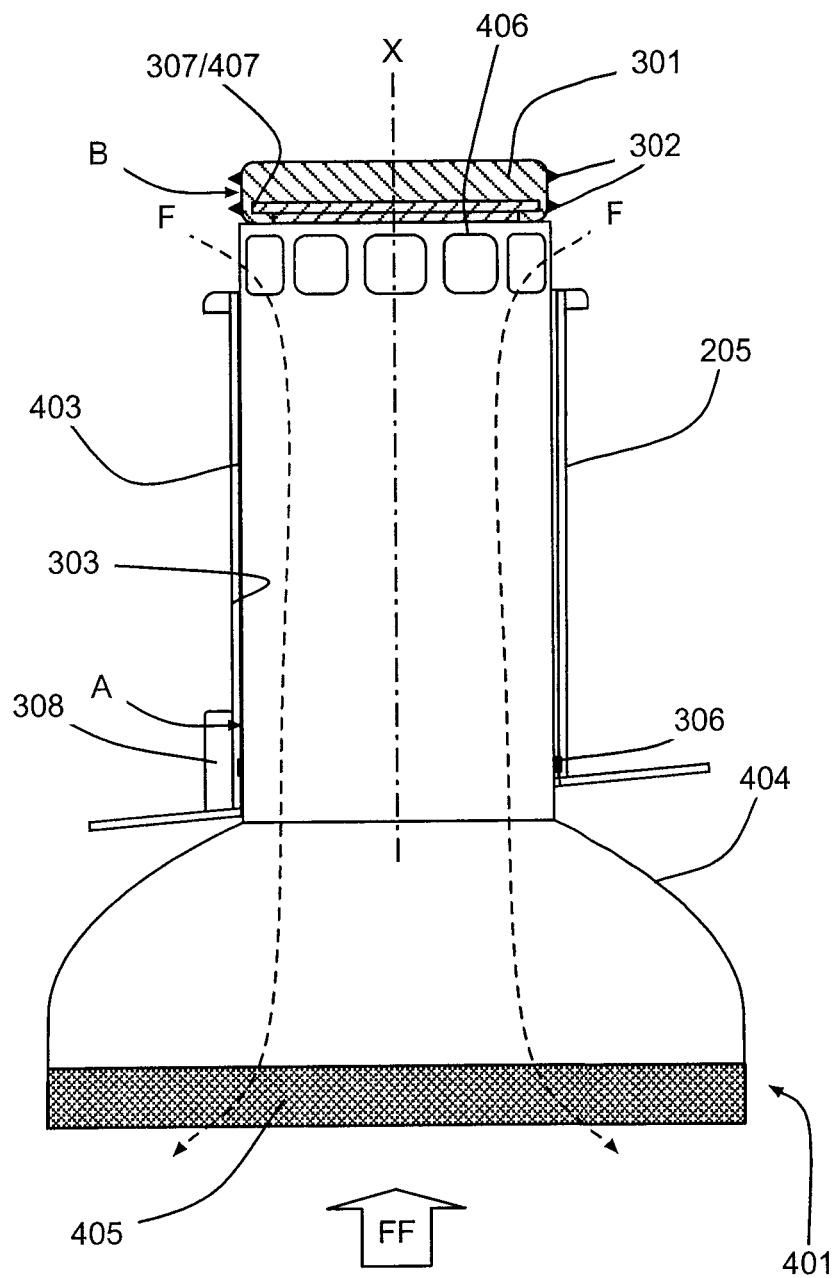
FIG. 5 is a schematic cross-sectional side view of the external flame barrier means of FIG. 4 coupled with the second vent pipe of FIG. 2.

FIG. 5 shows the external flame barrier means 401 in its operable position inserted within the second vent pipe 205 via the second ullage vent 207. The insertion process comprises the engagement of the bayonet coupling 307/407, which in turn unlocks the piston 301 from its lower position A in the vent pipe 205. The external flame barrier means 401 is then pushed upwardly along the axis X within the vent pipe 205 in combination with the piston 301. The movement of the piston 301 upwardly from its lower position A activates the locking mechanism in the bayonet coupling 307/407 so as to lock the piston 301 to the external flame barrier means 401. As the external flame barrier means 401 is fully inserted, the piston 301 is lifted to position B and the array of vents 406 emerge from the vent pipe to be exposed within the ullage 212 of the vent tank 107. The array of vents 406 is thus positioned to vent the ullage 212 to atmosphere by providing fluid communication with atmosphere. Furthermore, during the insertion of the external flame barrier means 401, any fuel sitting in the vent pipe 205 above the piston 301 is automatically cleared from the pipe during the insertion movement. Thus external fuel spillage is minimised and a flame barrier is present in any fluid flow routes between the vent tank and atmosphere throughout the insertion process.

The vent tanks 107 are thus arranged for use in two modes. The first mode is arranged for venting of the vent tanks 107 when no refuelling is taking place. In this first mode, the piston 301 is locked in its lower position A sealing the second vent pipe 205 and second ullage vent 207 and all venting of the vent tank 107 is provided by the first vent pipe 204 via the first ullage vent 206. The second mode is arranged for venting of the vent tanks 107 during a refuelling process. In this second mode the external flame barrier means 401 is used with the second ullage vent 207.

In the first mode, if liquid fuel from the fuel tanks 106 fills the vent tank 107 over its maximum designed liquid fuel level 211, the liquid fuel overflows the lip 213 of the first vent pipe 204 and flows down the first vent pipe 204 into the atmosphere via the first ullage vent 205. In the first mode, the piston 301 prevents any fuel egress from second ullage vent 207. In the second mode, the external flame barrier means 401 provides additional ventilation for the vent tank 107 via the second vent pipe 205. In the second mode, if the rate of liquid fuel entry to the vent tank 107 exceeds the liquid venting flow rate of the first vent pipe 204 then the level of fluid in the vent tank 107 will rise past the maximum designed liquid fuel level 211 until the liquid fuel overflows the lip 214 of the second vent pipe 205, flows down the second vent pipe 205, through the external flame barrier means 401 and to atmosphere via the second ullage vent 207. Thus, in the second mode, excess liquid fuel from the vent tank 107 may be vented via the first and second vent pipes 204, 205 simultaneously.

Figure 6:
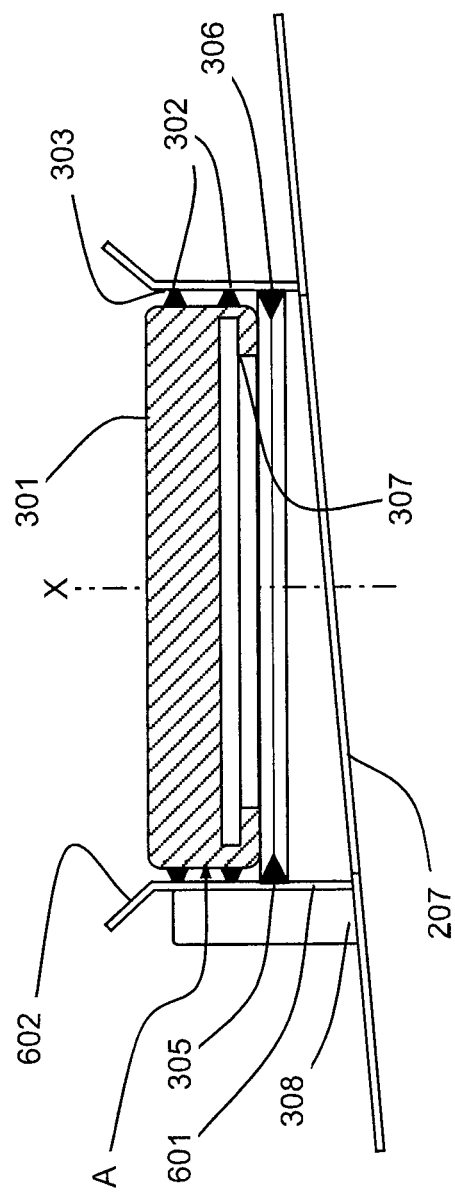
FIG. 6 is a schematic cross-sectional side view of a second vent pipe in accordance with a further embodiment for use in the vent tank of FIG. 2.

In a further embodiment, with reference to FIG. 6, a second vent pipe is omitted and replaced with a housing means 601 in the form of an annular structure fixed over the second ullage vent 207 and providing an internal bore 303 that conforms to the piston 301 and seals 302 so as to provide a fluid tight fit. Thus the piston 301 located within the housing means 601 provides a fluid tight sealing means or closure for the second ullage vent 207. In the present embodiment, the vertical extent of the housing means 601 substantially conforms to the height of the piston 301 when at its lower position A. The housing means 601 further comprises an upper open end 602 that is upwardly outwardly tapered so as to facilitate the insertion of the piston 301 into the housing 601.

Figure 7:
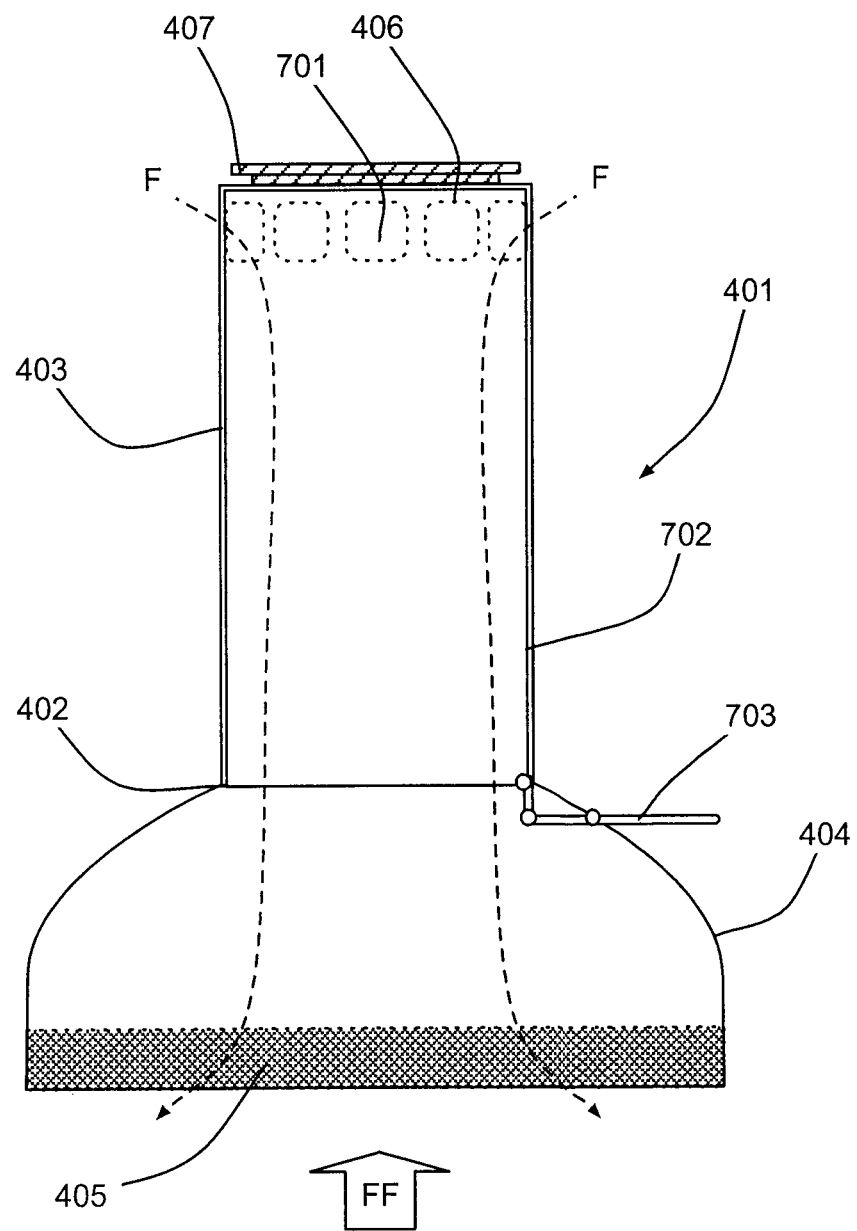
FIG. 7 is a schematic side view of external flame barrier means for use with the second vent pipe of FIG. 6.

In the present embodiment, with reference to FIG. 7, an external flame barrier means 401 comprises valve means 701 associated with the vent means 406 in the form of the vent array. In the present embodiment, the valve means 701 comprises an annular member 702 and an actuator mechanism 703. The outer surface of the annular member 702 is arranged to substantially conform to the interior surface of the upper member 403 with sufficient tolerance so as to be vertically slideable therein along the axis X. In the present embodiment, the actuator mechanism 703 is manually operable to raise and lower the valve means 701 between an upper position in which the vent means 406 is closed, as shown in FIG. 7, and a lower position in which the vent means 406 is open.

Figure 8:
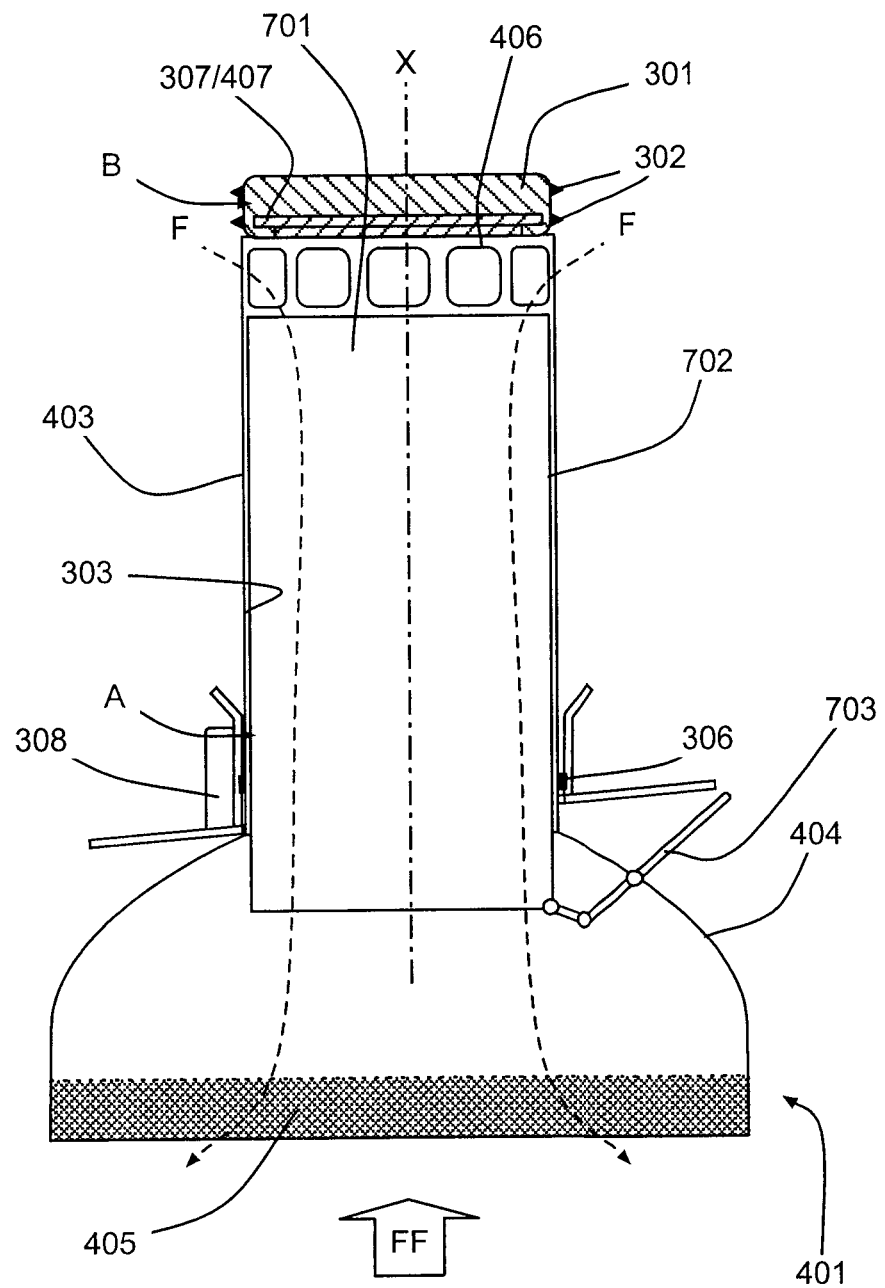
FIG. 8 is a schematic cross-sectional side view of the external flame barrier means of FIG. 7 coupled with the second vent pipe of FIG. 6.

FIG. 8 shows the external flame barrier means 401 in its operable position inserted within the housing means via the second ullage vent 207. The external flame barrier means 401 is inserted with the valve means 701 in their closed state. Once the external flame barrier means 401 has been fully inserted, the closed vent means 406 is located within the minimal ullage 212 of the vent tank 107. In other words, the vent means 406 is closed while travelling through any fuel that may be present in the vent tank 107 and, to prevent spillage, only opened when located within the ullage 212 so as to prevent spillage of fuel. When the external flame barrier means 401 is fully inserted, the vent means 406 are opened by manual operation of the actuator means 703 so as to open the minimal ullage 212 to atmosphere via the external flame barrier means 401.

The present embodiment provides increased space in vent tank or a reduced volume of vent tank as the volume that may be otherwise occupied by a second vent pipe is significantly reduced. As will be understood by those skilled in the art, the valve means 701 may be actuated automatically in response to insertion or removal. The valve means 701 may be operable under the control of or in cooperation with the locking means 308. In other words, the locking means 308 may be arranged to detect the full insertion or initial removal of the external flame barrier means 401 and to respectively open or close the valve means appropriately. The locking means may be further operable to lock the external flame barrier means 401 in its fully inserted position until actively manually released. One or more seals may be provided between valve means 701 and the upper part 403 of the external flame barrier means 401.

In the embodiments disclosed herein, the flame barrier elements are formed from a conventional flame barrier material such as layered wire mesh. As will be understood by those in the art, the flame barrier may be formed from any suitable material such as non-woven meshes or may comprise one or more granular or particulate layers.

In another embodiment, the second ullage vent is provided with a self-opening/closing hinged hatch arranged to operate in response to the insertion of an external flame barrier means, as described above with respect to FIG. 7, into the second ullage vent. In other words, insertion or attachment of the external flame barrier means in the second ullage vent causes the hatch to open automatically. Correspondingly, removal of the external flame barrier means causes the hatch to close automatically. In the present embodiment, the automatic hatch is biased into its closed position and opened by the mechanical force of the insertion of the external flame barrier means. As will be understood by those in the art, the automatic hatch may be powered or biased by any suitable means such as electrical or hydraulic systems.

In another embodiment, the external flame barrier means may comprise an intermediate conduit such as a hose or pipe connected between its upper and lower parts of the body member for conducting any fuel flowing from the second ullage vent away from the aircraft structure.

In a further embodiment, a hatch is provided for the second ullage vent for covering the external face of the piston and the lip seal. The hatch may be provided with a locking or retaining means to prevent accidental or unauthorised opening.

In another embodiment, the external flame barrier means or the second ullage vent are provided with retaining means, such as a latch mechanism, for retaining the external flame barrier means in the fully inserted position so as to avoid inadvertent removal of the external flame barrier means.

As will be understood by those skilled in the art, the coupling means between the external flame barrier means and the second ullage vent may be provided by any suitable coupling means such as correspondingly threaded male and female members, push or snap-fit connectors or any other coupling means suitable for carrying fuel.

As will be understood by those skilled in the art, the upper end of the second vent pipe may positioned at any point between top of vent tank and the first vent pipe. In fact, the second vent pipe may be positioned at any level above or below the height of the first vent pipe. In other words, it may be positioned upwardly to the point at which it might restrict the flow due to proximity with the top of the tank or down to the point where there is not enough length to provide support for effective sealing means. If the second vent pipe is substantially higher than the first vent pipe it will tend to reduce the amounts of fuel in the second vent pipe. If the second vent pipe is lower, while it will always fill, it will also reduce the amounts of fuel that can remain in the second vent pipe. Auxiliary drain means may be provided for the second vent pipe, for example, for draining the second vent pipe in situations other than a high capacity refuelling process.

As will be understood by those skilled in the art, the first ullage vent may be provided with an ice screen.

As will be understood by those in the art, any surface of one or more of the flame barrier elements may be corrugated or be formed with a convoluted cross section. Such corrugations or convolutions may run in any suitable direction through the flame barrier elements. For example, the corrugations or convolutions may run radially or circumferentially relative to the central axis of the corresponding external flame barrier means.

As will be understood by those in the art, the first ullage vent may be fed by or feed into an aerodynamic duct, such as a NACA (National Advisory Committee for Aeronautics) duct or the like, for providing an aerodynamic interface between the first ullage vent and the external surface of the aircraft.

As will be understood by those skilled in the art, where appropriate, the seals and corresponding sealing surfaced may be reversed. Further seals may be added or seal may be duplicated. The seal structure or form may be provided as appropriate for a given application.

In the embodiments described above with reference to FIG. 7, the external flame barrier means is provided with valve means operable to open and close the vent means. In embodiment described above with reference to FIGS. 3 & 4 where a second vent pipe is provided, the second vent pipe is arranged to act as a valve member for the vent means carried by the external flame barrier means. In other words, all embodiments described above comprise vent means and valve means arranged for relative movement so as to open or close the vent means appropriately.

As will be understood by those skilled in the art, any suitable valve mechanism may be employed for opening and closing the vents. The valves may be associated solely with the corresponding vent pipe or with the external flame barrier means or associated partly with each. The valve means may be located in the upper facing end of the external flame barrier means where the sealing means is not carried the upper face but, for example, a pivoting sealing mechanism as described above.

As will be understood by those skilled in the art, mechanisms may be employed for aiding the connection or disconnection of the coupling between the sealing means and the external flame barrier means. For example, the housing for the piston, which in some embodiments may comprise the second vent pipe, may be fully or partially splined or otherwise keyed so as to hold the sealing means from rotation to aid the rotary decoupling or coupling movement for the external flame barrier means. Alternatively, the sealing means and housing or vent pipe may be non-circular in the relevant cross section. As will be understood, some coupling means may require other movements for coupling and decoupling either in combination with or instead of one or more rotary movements.

As will be understood by those skilled in the art, the external flame barrier means of FIG. 7 may be used effectively with the vent pipe arrangement of FIG. 3.

Embodiments of the invention may enable the first vent pipe and flame barrier arrangements to be more compact since the first vent pipe need only be capable of the relatively low flow rates required when the aircraft is operating in modes other than the refuelling mode.

The external flame barrier means in combination with the second ullage vent may be arranged so as to provide comparable or greater fluid flow than refuelling means/pump. This arrangement will reduce the risk of the refuelling pump increasing the pressure within the fuel tank system beyond its structural limits and thus avoid damage to the aircraft structure. The external flame barrier means may be arranged for use during high rate refueling, whereas during lower pressure or standard refueling operations only the internal vent pipe is utilized.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the scope of applicant's general inventive concept.

The invention claimed is:

1. An aircraft fuel tank system comprising:
   a vent tank comprising an inlet from one or more fuel tanks and a first and second ullage vent means within said vent tank, said vent tank being arranged to provide a predetermined maximum fuel capacity and having a minimal ullage at said maximum fuel capacity;
   sealing means arranged in a closed position to provide a fluid tight seal for said second ullage vent and operable between said closed position and an open position for enabling fluid flow between said vent tank and atmosphere via said second ullage vent;
   an external flame barrier means comprising a flame barrier element and vent means, said external flame barrier means being arranged for insertion through said second ullage vent into the ullage of said vent tank and slidable within a bore of said second ullage vent so as to provide a conduit for said fluid flow between said vent tank via said vent means and said flame barrier element to atmosphere; and
   said sealing means is arranged to be coupled to said external flame barrier.

2. An aircraft fuel tank system according claim 1 in which said sealing means is arranged to operate automatically in response to said insertion of said external flame barrier means.

3. An aircraft fuel tank system according to claim 1 in which said ullage vent is arranged to sealingly engage with said external flame barrier means prior to said sealing means opening so as to mitigate spillage from said vent tank during said insertion.

4. An aircraft fuel tank system according to claim 1 in which said sealing means is arranged to open or close automatically in response to the respective insertion or removal of said external flame barrier means.

5. An aircraft fuel tank system according to claim 1 in which said sealing means is arranged to be carried upwardly by said external flame barrier means during said insertion.

6. An aircraft fuel tank system according to claim 1 in which said sealing means is arranged to be carried by said external flame barrier means during said insertion.

7. An aircraft fuel tank system according to claim 1 further comprising locking means arranged to lock said sealing means in said closed position and to unlock said sealing means in response to said insertion of said external flame barrier means.

8. An aircraft fuel tank system according to claim 7 in which said locking means is arranged to prevent removal of said external flame barrier means from said second ullage vent unless said sealing means is in said closed position.

9. An aircraft fuel tank system according to claim 7 in which said locking means is operable to prevent opening of said sealing means unless said external flame barrier means is fully inserted.

10. An aircraft fuel tank system according to claim 1 in which said external flame barrier means comprises a valve means operable to open or close said external flame barrier.

11. An aircraft fuel tank system according to claim 10 in which said valve means comprises a sleeve member slideably operable to open and close said vent means.

12. An aircraft fuel tank system according to claim 1 further comprising a vent pipe providing fluid communication between said second ullage vent and said ullage.

13. An aircraft fuel tank system according to claim 12 in which said external flame barrier means is arranged to clear said vent pipe by said insertion.

14. An aircraft fuel tank system according to claim 12 in which said insertion of said external flame barrier means is arranged to move said sealing means along and out of said vent pipe.

15. An aircraft fuel tank system, comprising:
a vent tank comprising an inlet from one or more fuel tanks and a first and second ullage vent means within said vent tank, said vent tank being arranged to provide a predetermined maximum fuel capacity and having a minimal ullage at said maximum fuel capacity;
sealing means arranged in a closed position to provide a fluid tight seal for said second ullage vent and operable between said closed position and an open position for enabling fluid flow between said vent tank and atmosphere via said second ullage vent;
an external flame barrier means comprising a flame barrier element and vent means, said external flame barrier means being arranged for insertion through said second ullage vent into the ullage of said vent tank and slidable within a bore of said second ullage vent so as to provide a conduit for said fluid flow between said vent tank via said vent means and said flame barrier element to atmosphere; and
wherein said sealing means comprises a bore adjacent said second ullage vent and a piston operable to close said second ullage vent when sealably engaged within said bore and to open said second ullage vent when positioned out of said bore, said sealing means being operable in response to the insertion of said external flame barrier means via said second ullage vent.

16. An aircraft fuel tank system comprising:
a vent tank comprising an inlet from one or more fuel tanks and a first and second ullage vent pipes within said vent tank, said vent tank being arranged to provide a predetermined maximum fuel capacity and having a minimal ullage at said maximum fuel capacity;
a sealing piston arranged in a closed position to provide a fluid tight seal for said second ullage vent and operable between said closed position and an open position for enabling fluid flow between said vent tank and atmosphere via said second ullage vent;
an external flame barrier apparatus comprising a flame barrier element and radially spaced vent openings, said external flame barrier apparatus being arranged for insertion through said second ullage vent pipe into the ullage of said vent tank and slidable within a bore of said second ullage vent so as to provide a conduit for said fluid flow between said vent tank via said sealing piston and said flame barrier element to atmosphere; and
said sealing piston is arranged to be coupled to said external flame barrier element.

* * * * *